United States Patent [19]
Lo et al.

[11] Patent Number: 5,804,654
[45] Date of Patent: Sep. 8, 1998

[54] TETRAFLUOROETHYLENE-CONTAINING POWDER, PROCESS FOR MAKING SAME, ARTICLES MOLDED THEREFROM AND COMPOSITIONS CONTAINING SUCH POWDER

[75] Inventors: Fai Lo, Angicourt; François Serge Mazeres, Nivillers, both of France; Ronald van der Wal, Steenbergen, Netherlands

[73] Assignee: General Electric Company, Pittsfield, Mass.

[21] Appl. No.: 606,027

[22] Filed: Oct. 6, 1995

[30] Foreign Application Priority Data

Apr. 28, 1995 [FR] France .................................. 95 05172

[51] Int. Cl.$^6$ .......................... C08L 69/00; C08L 55/02; C08F 259/08
[52] U.S. Cl. ................ 525/67; 525/71; 525/72; 525/276; 525/902
[58] Field of Search .................... 525/276, 902, 525/67, 71, 72

[56] References Cited

U.S. PATENT DOCUMENTS

| | | |
|---|---|---|
| 3,853,809 | 12/1974 | Martin ..................................... 525/276 |
| 4,469,846 | 9/1984 | Khan ....................................... 525/276 |
| 4,574,141 | 3/1986 | Cheng ..................................... 525/276 |
| 4,877,839 | 10/1989 | Conti-Ramsden ..................... 525/276 |
| 5,010,121 | 4/1991 | Yeates .................................... 525/276 |
| 5,324,785 | 6/1994 | Noda ...................................... 525/276 |
| 5,494,752 | 2/1996 | Shimizu .................................. 525/276 |

FOREIGN PATENT DOCUMENTS

| | | |
|---|---|---|
| 0 166 187 B1 | 8/1990 | European Pat. Off. . |
| 3903547 | 8/1990 | Germany . |

OTHER PUBLICATIONS

Odian, "Monomer Reactivity Ratios in Graft Copolymerization", Journal of Polymer Science Part A–1 vol. 9 pp. 91–105; 1971.

*Primary Examiner*—David Buttner

[57] ABSTRACT

A tetrafluoroethylene-containing powder contains free flowing particles of a tetrafluoroethylene polymer at least partially encapsulated by a polymer or copolymer selected from polystyrene, poly-α-alkylstyrenes, styrene-acrylonitrile copolymers, α-alkylstyrene-acrylonitrile copolymers, acrylonitrile-butadiene-styrene copolymers, styrene-butadiene rubbers and their mixtures. The powder is obtained by emulsion polymerization of one or more monomers in the presence of a tetrafluoroethylene polymer and is useful as an additive in polymer compositions and in making molded articles.

12 Claims, 2 Drawing Sheets

TETRAFLUOROETHYLENE-CONTAINING POWDER, PROCESS FOR MAKING SAME, ARTICLES MOLDED THEREFROM AND COMPOSITIONS CONTAINING SUCH POWDER

TECHNICAL FIELD

The present invention relates, in a general manner, to novel polymerizate-based polymer blends comprising groups of tetrafluoroethylene derivatives (designated hereinbelow by tetrafluoroethylene polymerizate) and to their process for manufacture, to the articles obtained by extrusion moulding, extrusion blow moulding and injection moulding of these novel blends, as well as to the use of these novel blends in polymer compositions.

More particularly, the present invention relates to a novel polymer blend including tetrafluoroethylene polymerizate particles totally or partially encapsulated by a polymer or copolymer resulting from the polymerization of monomers, or mixtures of monomers which can be emulsion-polymerized, in particular by radical route, the said polymer blend being substantially free of tetrafluoroethylene polymerizate filaments forming a network connecting the particles.

The novel polymer blend may be obtained in the form of a free-flowing powder which does not have a tendency to block, thereby making it particularly easy to handle and store, in particular in any type of plastic for which the handling of a polymerizate including groups of tetrafluoroethylene derivatives proves difficult.

The novel polymer blend, when it is incorporated in an effective quantity into a polymer composition, in particular a fire-retarded polymer composition, surprisingly improves the fire resistance without impairing the mechanical properties of the polymer composition, and surprisingly even improves some of the mechanical properties of the composition, such as, for example, the tensile elongation and the impact strength.

BACKGROUND OF THE INVENTION

Document DE-A-3,903,547 describes mixtures of polysiloxane-polycarbonate block copolymers and PTFE which are used as rigid thermoplastics, having a good environmental stress cracking resistance. The mixture may be obtained, inter alia, by synthesizing the block copolymers in the presence of the required quantity of PTFE.

Document EP-A-0,166,187 describes a powder composition containing a tetrafluoroethylene polymerizate. The powder is obtained by mixing a dispersion of poly (tetrafluoroethylene) with a latex of grafted polymerizate, for example an acrylonitrile-butadiene-styrene grafted polymerizate, filtering and drying in order to obtain a powder.

The powders obtained in this way by coprecipitation (or alternatively called co-coagulation or co-flocculation powders) have the drawback of having high self-adhesion, in particular for high PTFE contents, for example 25% by weight or more, and as a result do not flow freely, thereby making them difficult to handle and to store.

BRIEF SUMMARY OF THE INVENTION

The subject of the present invention is thus a polymer blend which contains a tetrafluoroethylene polymerizate, totally or partially encapsulated by a polymer or copolymer, and which is in the form of a free-flowing powder.

The subject of the invention is also a polymer blend which includes tetrafluoroethylene polymerizate particles, totally or partially encapsulated by a polymer or copolymer, and which is substantially free of tetrafluoroethylene polymerizate filaments forming a network connecting the particles of the blend together.

The subject of the present invention is also a process for preparing a novel polymer blend which includes tetrafluoroethylene polymerizate particles totally or partially encapsulated by a polymer or copolymer and being in the form of a free-flowing powder, the novel polymer blend being substantially free of tetrafluoroethylene polymerizate filaments forming a network connecting the particles of the blend together.

A further subject of the invention is articles obtained, for example, by extrusion moulding, extrusion blow moulding and injection moulding of the novel polymer blend.

Finally, the subject of the invention is compositions, in particular fire-retarded compositions, comprising the novel polymer blend, the compositions obtained having improved fire-resistance properties and mechanical properties.

DETAILED DESCRIPTION OF THE INVENTION

Figure 1:
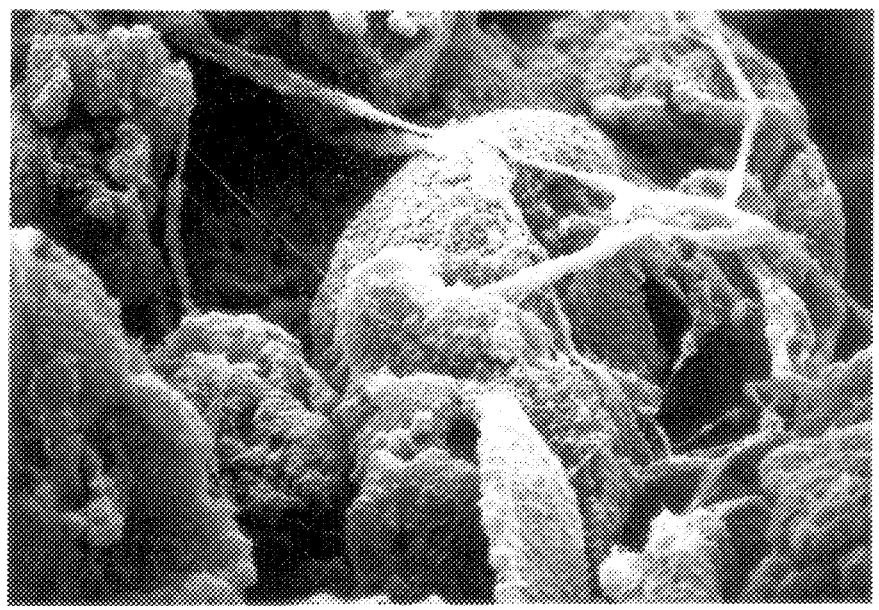
FIG. 1 shows a scanning electron micrograph of a polytetrafluoroethylene/poly(styrene-acrylonitrile) powder obtained by coprecipitation.

According to the invention, a novel polymer blend is produced which includes tetrafluoroethylene polymerizate particles totally or partially encapsulated by a polymer or copolymer obtained by polymerization of monomers or mixtures of monomers which can be emulsion-polymerized, in particular by radical route.

The novel tetrafluoroethylene-polymerizate-based blend is essentially characterized by a morphology different from that of tetrafluoroethylene-polymerizate-based polymer blends obtained by coprecipitation and in that it is virtually free of tetrafluoroethylene polymerizate filaments forming a: network connecting the particles of the blend together, in particular for relatively high tetrafluoroethylene polymerizate contents.

As tetrafluoroethylene polymerizate, it is possible to use, in the novel polymer blends of the present invention, poly (tetrafluoroethylene), tetrafluoro-ethylene-hexafluoroethylene copolymers, and copolymers of tetrafluoroethylene with small quantities of copolymerizable ethylenically unsaturated monomers. These polymers are known and are described, inter alia, in "Vinyl and related polymers", Schildknecht, John Wiley & Sons, Inc., New York, 1952, pages 484–494, and "Fluoropolymers" Woll, Wiley-Interscience, John Wiley & Sons, Inc., New York, 1972.

Preferably, poly(tetrafluoroethylene) in used.

The polymers and copolymers for encapsulating the tetrafluoroethylene polymerizate may be any polymer or copolymer obtained from monomers or mixtures of monomers which can be emulsion-polymerized, in particular by radical route.

Among the polymers which can be used as encapsulation polymers in the new blends of the present invention, mention may be made of polystyrene, poly(α-alkylstyrenes) such as poly-α-methylstyrene, poly-α-ethylstyrene, poly-α-propylstyrene, poly-α-butylstyrene, poly-p-methylstyrene, halogenated polystyrene, acrylic polymers such as polyacrylonitrile, polymethacrylonitrile, poly(alkyl acrylates) such as poly(methyl acrylate), poly(ethyl acrylate), poly(propyl acrylate), poly(butyl acrylate), poly (alkyl methacrylates) such as poly(methyl methacrylate), poly(ethyl methacrylate), poly(propyl methacrylate), poly (butyl methacrylate), polybutadienes, vinyl polymers such as poly(vinyl acetate), poly(vinyl chloride), poly(vinylidene chloride), poly(vinylidene fluoride), poly(vinyl alcohols), and their mixtures.

Among the copolymers which can be used as encapsulation copolymers in the novel polymer blends of the present invention, mention may be made of copolymers of styrene, alkyl acrylate, alkyl methacrylate, vinyl chloride with another monomer such as an acrylonitrile, methacrylonitrile, alkyl methacrylate or alkyl acrylate monomer, as well as grafted polymerizates such as, for example, polybutadiene, polychloroprene or styrene-butadiene, for example an acrylonitrile-butadiene copolymer rubber, an alkyl acrylate rubber, a styrene-butadiene rubber, an EPDM rubber or a silicon rubber.

According to the present invention, the recommended polymers are polystyrene, poly(α-alkylstyrenes), in particular poly(α-methylstyrene), vinyl polymers, in particular poly(vinyl chloride), poly(vinyl acetate) and poly(methyl methacrylate).

The recommended copolymers for the blend of the present invention are styrene-acrylonitrile (SAN) and acrylonitrile-butadiene-styrene (ABS) copolymers, α-alkyl-styrene-acrylonitrile copolymers, in particular α-methylstyrene-acrylonitrile (AMSAN) copolymers, styrene-butadiene rubbers (SBR), and their mixtures.

Most particularly recommended as copolymers are styrene-acrylonitrile and α-methylstyrene-acrylonitrile copolymers.

The proportion of tetrafluoroethylene polymerizate in the novel polymer bland of the invention may vary widely and is generally between 0.01 and 80% by weight with respect to the total weight of polymers in the blend, and preferably between 0.05 and 70% by weight.

The novel polymer blend according to the invention may be prepared simply by emulsion polymerization, preferably by radical route, of a monomer or a mixture of monomers in the presence of a polytetrafluoroethylene latex. Various emulsion-polymerization processes may be used to produce the encapsulation polymer, for example a discontinuous, semi-continuous or continuous emulsion. The term emulsion used in the present application denotes an emulsion alone or an emulsion-suspension.

The polymerizate latex including groups of TFE derivatives may be introduced into the reaction medium for polymerizing the encapsulation polymer or copolymer right from the start, that is to say before any polymerization has begun, or during the polymerization, generally before 90% by weight or more of the monomers have been polymerized or copolymerized.

Generally, the tetrafluoroethylene polymerizate latex comprises 20 to 80% by weight of solids, and the particle size of this latex is between 0.05 and 20 µm (measured by laser diffraction), preferably between 0.1 and 1 µm.

Emulsion polymerization by radical route is a well known process. The radical polymerization is described, inter alia, in the work "Chemie macromoléculaire [Macromolecular chemistry]", volume 1, chapter III, by G. CHAMPETIER, HERMANN.

Once the polymerization of the encapsulation polymer has been accomplished, the next step is coagulation and drying, in order to obtain a powder of polymer blend which flows freely, does not have a tendency to block and is substantially free of tetrafluoroethylene polymerizate filaments forming a network connecting the particles of the blend together.

EXAMPLES 1 TO 3

Novel polymer blends according to the invention, including tetrafluoroethylene polymerizate particles encapsulated by a styrene-acrylonitrile (SAN) copolymer were prepared using a semi-continuous emulsion process.

Polymerization:

The novel blends, comprising PTFE particles encapsulated by the styrene-acrylonitrile copolymers (PTFE/SAN) were prepared in the following manner:

a 15 liter reactor was used at a temperature of 60° C. and stirred at 120 revolutions per minute. The SAN copolymer was prepared by using a ferrous-ion/cumene hydroperoxide (CHP) redox system as a radical initiator in combination with an ethylenediaminetetraacetic acid (EDTA) chelating agent and sodium hydroxymethanesulphinate dihydrate (SFS) as reducing agent. t-Dodecyl mercaptan (TDM) was used as chain-transfer agent. The tetrafluoroethylene polymerizate latex was introduced in the form of a solution of the polymerizate in a soap. The soap system was tallow fatty acid (TFA). The reactor was initially charged with the entire soap/tetrafluoroethylene-polymerizate solution and with 15% by weight of all the other solutions (SFS/EDTA solution, $FeSO_4$ solution and monomer/TDM solution), before starting the feed with initiator. Next, only the CHP initiator was introduced for a certain time before starting the feed of all the other solutions. Once the feeds were completed, the reactor was kept stirred at a temperature of 60° C. during a maximum post-polymerization step of 180 minutes. A novel blend of tetrafluoroethylene-polymerizate/SAN was obtained in this way.

The details of the manufacturing processes and of the blends obtained are indicated in Table 1 below.

TABLE 1

| EXAMPLE No. | 1 | 2 | 3 |
|---|---|---|---|
| SAN/PTFE ratio | 50/50 | 50/50 | 40/60 |
| Solids content (theoretical) | 24.3% | 34.6% | 34.6% |
| Initial charge of the reactor: | | | |
| Soap/PTFE solution: | parts by weight | parts by weight | parts by weight |
| Water | 106 | 114 | 114 |
| PTFE (dry) | 25 | 50 | 60 |
| Water of the PTFE | 14.676 | 28.964 | 34.757 |
| TFA (tallow fatty acid | 0.285 | 0.570 | 0.456 |
| KOH | 0.0685 | 0.1507 | 0.1206 |
| Reactor heated to 60° C. then addition of: | | | |
| Solution of monomers: | | | |
| Styrene | 2.5926 | 5.2830 | 4.2264 |
| Acrylonitrile | 1.1111 | 2.2642 | 1.8113 |
| TDM | 0.0148 | 0.0302 | 0.0242 |

TABLE 1-continued

| EXAMPLE No. | 1 | 2 | 3 |
|---|---|---|---|
| SFS/EDTA solution: | | | |
| Water | 4.2963 | 5.2075 | 4.3774 |
| SFS | 0.0100 | 0.0204 | 0.0163 |
| EDTA | 0.000207 | 0.0004 | 0.0003 |
| FeSO$_4$ solution: | | | |
| Water | 0.7778 | 1.5094 | 1.5094 |
| FeSO$_4$, 7H$_2$O | 0.000081 | 0.0002 | 0.0001 |
| t = 0, start of feed: | | | |
| CHP | 0.4 | 0.2 | 0.16 |
| Feed time (min) | 27 | 53 at | 53 |
| t = (min) | 4 | 8 | 8 |
| Start of feed of: | | | |
| Solution of monomers: | | | |
| Styrene | 14.9074 | 29.7170 | 23.7736 |
| Acrylonitrile | 6.3889 | 12.7358 | 10.1887 |
| TDM | 0.0852 | 0.1698 | 0.1358 |
| SFS/EDTA solution: | | | |
| Water | 24.7037 | 29.2925 | 24.6226 |
| SFS | 0.0575 | 0.1146 | 0.0917 |
| KDTA | 0.0012 | 0.0024 | 0.0019 |
| FeSO$_4$ solution: | | | |
| Water | 4.4722 | 8.4906 | 8.4906 |
| FeSO$_4$, 7H$_2$O | 0.0005 | 0.0009 | 0.0007 |
| Feed time (min) | 23 | 45 | 45 |
| Reactor kept at 60° C. after completing the feeds: | | | |
| Time (min) | 120 | 180 | 180 |

The conversion (based on the solids content) and the pH were monitored as a function of time for each example. The results are indicated in Table 2.

TABLE 2

| | Example 1 | | Example 2 | | Example 3 | |
|---|---|---|---|---|---|---|
| Time (min) | Conversion (%) | pH | Conversion (%) | pH | Conversion (%) | pH |
| 0 | 1.11 | 9.56 | 1.04 | 10.01 | 4.8 | 9.83 |
| 15 | | | 1.57 | 10.08 | 4.21 | 9.94 |
| 19 | 7.22 | 9.62 | | | | |
| 30 | 21.55 | 9.61 | 8.92 | 10.06 | 9.49 | 9.84 |
| 45 | 44.68 | 9.5 | 29.24 | 9.89 | 28.58 | 9.62 |
| 60 | 62.8 | 9.43 | 51.37 | 9.75 | 51.57 | 9.56 |
| 75 | 69.22 | 9.38 | | | | |
| 90 | 73.42 | 9.35 | 85.79 | 9.5 | 85.71 | 9.41 |
| 105 | 77.46 | 9.23 | | | | |
| 120 | 80.67 | 9.28 | 91.62 | 9.56 | 93.22 | 9.35 |
| 135 | 83.8 | 9.15 | | | | |
| 150 | 87.25 | 9.15 | 93.06 | 9.56 | 95.02 | 9.31 |
| 180 | | | 93.7 | 9.55 | 95.82 | 9.32 |
| 210 | | | 93.87 | 9.59 | 96.18 | 9.28 |
| 233 | | | 93.7 | 9.5 | 96.32 | 9.28 |

Coagulation and drying:

The polymer blends obtained were introduced in an acid solution (two parts of sulphuric acid in water) and heated to 95° C. with vigorous stirring. The solids content was 15% by weight. Introduction of the blend latices was completed in approximately 10 minutes. The slurry obtained was kept stirred at this temperature for 20 minutes before centrifuging. The powder obtained was then re-impasted for 30 minutes at 55°. The solids content of the paste was 18%. After centrifugation, the powder obtained was dried in a fluidized-bed dryer at a temperature of 60° C. for approximately 2 hours. A free-flowing powder having a final moisture content of between 0.3 and 0.4% was obtained.

By way of comparison, a polymer blend of polytetrafluoroethylene and SAN was prepared containing 50% by weight of PTFE and 50% by weight of SAN by coagulation (coprecipitation), under identical conditions, from a mixture of SAN latex and PTFE latex.

The flowability of the powders obtained was evaluated using a funnel test. The results are indicated in Tables 3 and 4 below.

TABLE 3

| | funnel diameter (mm) | 15 | 10 | 8 | 5 | 3.5 |
|---|---|---|---|---|---|---|
| pure SAN | time (s) | 1.5 | 4 | 7 | 22 | 126 |
| | number of taps on the funnel | 0 | 0 | 0 | 0 | 22 |
| PTFE/SAN 50/50 coprecipitation | time (s) | no flow | | | | |
| PTFE/SAN 50/50 Example 1 | time (s) | 4 | 8 | 14 | no flow | |
| | number of taps on the funnel | 0 | 0 | 2 | | |
| PTFE/SAN 50/50 Example 2 | time (s) | 2.5 | 5.5 | 9 | 44 | no flow |
| | number of taps on the funnel | 0 | 0 | 0 | 3 | |
| PTFE/SAN 60/40 Example 3 | time (s) | 4.5 | 16 | 34 | no flow | |
| | number of taps on the funnel | 0 | 2 | 8 | | |

TABLE 4

| particle size ($\mu$m) | pure SAN | PTFE/SAN 50/50 coprecipitation | PTFE/SAN 50/50 Example 1 | PTFE/SAN 50/50 Example 2 | PTFE/SAN 60/40 Example 3 |
|---|---|---|---|---|---|
| >1000 | 26.9% | not | 23.5% | 33.6% | 9.9% |
| >800 | 36.9% | measurable | 36.9% | 43.7% | 14.9% |
| <160 | 2.2% | | 3.8% | 3.3% | 20.4% |
| <63 | — | | 0.9% | 1.0% | 4.8% |
| <50 | — | | 0.7% | 0.9% | — |
| average | 695 | | 650 | 720 | 360 |

The results show that the powders of blends according to the invention flow much more easily than the powder obtained by coagulation. Particle-size measurements were also carried out on each of the powders by passing them through a series of screens. The particle size of the powder obtained by coagulation of a latex mixture could not be measured because of the self-adhesion of the powder, preventing it from passing through the screens. It will be noted that this self-adhesion phenomenon increases with the PTFE content of the blend. It is clear that the powders of blend according to the invention have a considerably lower tendency than the powders obtained by coagulation of a latex mixture, in particular for high PTFE contents.

Photomicrographs of the powders of the blend according to the invention and of the powder obtained by coprecipitation of a latex mixture were also obtained.

FIG. 1 is a scanning electron micrograph (magnification 25000×) of the 50/50 PTFE/SAN blend powder obtained by coprecipitation of a latex mixture. As this figure shows, the SAN particles are linked by PTFE filaments.

Figure 2:
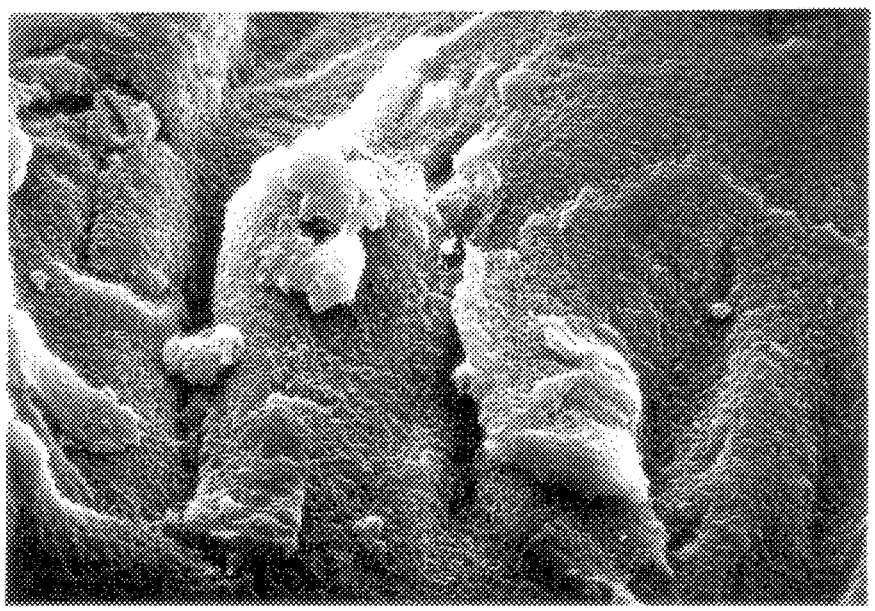
FIG. 2 shows a scanning electron micrograph of a polytetrafluoroethylene/poly(styrene-acrylonitrile) powder obtained by the process of the present invention.
Figure 3:
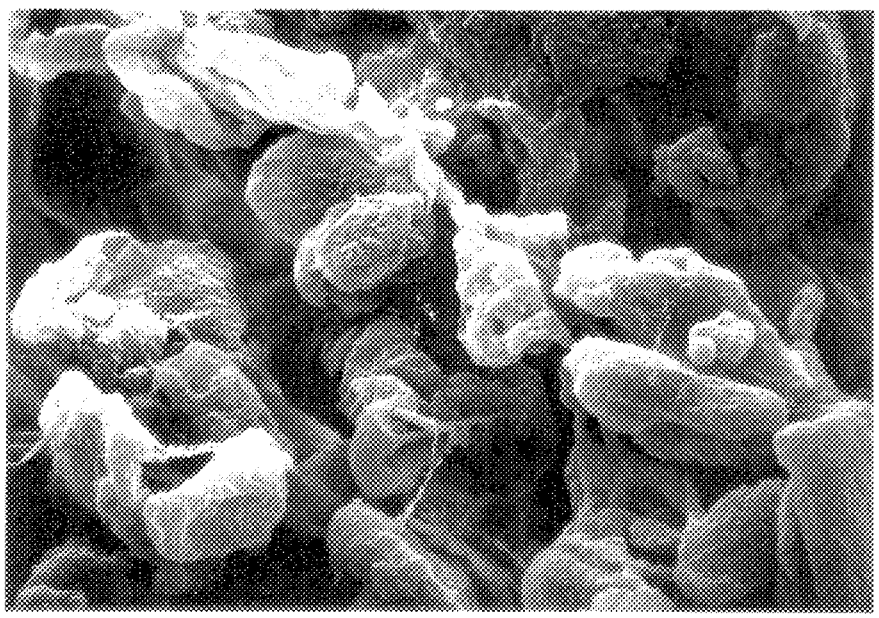
FIG. 3 shows a scanning electron micrograph of a polytetrafluoroethylene/poly(styrene-acrylonitrile) powder obtained by the process of the present invention.

FIGS. 2 and 3 are scanning electron micrographs (magnification 25000×) of the novel blends of Examples 1 and 3, according to the present invention.

Although in FIG. 1 the number of filaments connecting the powder particles are so numerous that they prevent the powder from flowing freely, as may be seen in FIGS. 2 and 3, the powder has no filaments joining the particles in the case of the blend of Example 1 and virtually no filaments in the case of the blend of Example 3, so that the powders obtained flow freely, even with a level of PTFE as high as 60% by weight.

As indicated previously, the novel blends according to the invention can be used directly to obtain articles by extrusion moulding, extrusion blow moulding or injection moulding.

The novel blends according to the invention prove to be particularly useful for increasing the fire resistance of polymer compositions, in particular fire-retarded polymer compositions.

The tetrafluoroethylene polymerizates have already been used as anti-drip agents in fire-retarded polymer compositions. However, the use of theme polymerizates has several drawbacks. In particular, compositions containing such tetrafluoroethylone polymerizates lead to extruded films having a very poor surface appearance, exhibiting non-malted particles at the surface or the tetrafluoroethylone polymerizate forms a fibrous network in the polymer matrix, which results in very low impact strength characteristics. Finally, the incorporation of theme tetrafluoroethylene polymerizate powders tends to increase the opacity of the initially transparent matrices.

Apparently, these defects are due to poor dispersion of the tetrafluoroethylene polymerizate particles in the matrix of the composition.

The incorporation of the novel tetrafluoroethylene-polymerizate-based blends according to the invention remedy the above drawbacks.

In particular, the use of these novel encapsulated tetrafluoroethylone-polymerizate-based blends makes it possible to obtain a high tetrafluoroethylene polymerizate content in a masterbatch (for example greater than 40%), this being virtually impossible to obtain using other ways of preparing the masterbatch (for example by co-coagulation of polytetrafluoroethylene latex with a latex of the polymer support). The novel encapsulated tetrafluoroethylone-polymerizate blends are easily dispersible and are compatible with the matrix, the very fine particles of tetrafluoroethylene polymerizates being uniformly dispersed, which results in excellent surface appearance of the injection-moulded or extrusion-moulded parts while still keeping the other excellent properties of the composition.

In particular, the use of the novel blends according to the invention does not adversely affect the impact strength, in particular the multiaxial impact strength, and the Izod impact strength, even with high levels of tetrafluoroethylene polymerizate (for example 60%).

The subject of the present invention is therefore a composition including a quantity of polymer blend according to the invention such that the tetrafluoroethylene polymerizate content, per 100 parts by weight of polymer matrix, is between 0.05 and 10 parts by weight, preferably 0.05 parts to 6 parts by weight.

Preferably, the composition further comprises a fire retardant.

Among the polymers that can be used for the polymer matrix of the compositions according to the invention, mention may be made of polycarbonate, polyphenylene oxide (PPO), poly(alkylene terephthalates) such as poly (butylene terephthalate) and poly (ethylene terephthalate), vinyl polymers such as poly(vinyl chloride), poly(vinyl acetate), poly(vinyl alcohol), polyalkylenes such as polypropylene and polyethylene, polyacrylates and polymethacrylates such as poly(methyl acrylate) and poly(methyl mothacrylate), polystyrenes and, in particular high-impact polystyrenes (HIPS), polysulphones and polyetherimides, acrylonitrile-butadiene-styrene and styrene-acrylonitrile copolymers and acrylonitrile-butadiene-styrene/polycarbonate blends, poly(phenylone oxide)/polystyrene blends, and thermoplastic-polyester/polycarbonate blends such as poly(butylene terephthalate)/polycarbonate blends.

Preferably, the compositions according to the invention are fire retarded.

As fire retardants, it is possible to use any known fire-retardant system for the compositions. Among fire retardants, mention may be made of organophosphates and halogenated organic compounds. Preferably, brominated aromatic compounds are used such as, for example, compounds derived from tetrabromobisphenol A. Preferably, still, synergistic combinations are used that include halogenated aromatic compounds, in particular brominated compounds, and antimony compounds, such as antimony oxide for example.

Among organophosphate fire retardants, mention may be made of, inter alia, phenyl bisdodecyl phosphate, phenyl bisneopentyl phosphate, polyethylene hydrogen phosphate, phenyl bis(3,5,5'-trimethylhexyl) phosphate, ethyl diphenyl phosphate, 2-ethylhexyl di-p-tolyl phosphate, diphenyl hydrogen phosphate, bis(2-ethylhexyl) p-tolyl phosphate, tritolyl phosphate, bis(2-ethylhexyl) phenyl phosphate, trinonyl phosphate, phenyl methyl hydrogen phosphate, didodecetyl p-tolyl phosphate, tricresyl phosphate, triphenyl phosphate, halogenated triphenyl phosphate, dibutyl phenyl phosphate, 2-chloroethyl diphenyl phosphate, 2-ethylhexyl diphenyl phosphate and diphenyl hydrogen phosphate, possibly in combination with hexabromobenzene and antimony oxide.

Among halogenated organic compounds which can be used as fire retardants in the compositions of the present invention, mention may be made of tetrabromobisphenol A, bis(tribromophenoxy)ethane, poly(bromodiphenyl ether), poly(bromophenol), poly(bromophenyl alkyl ether), poly (bromobenzyl acrylate) or polyacrylate, poly (bromocyclododecane), poly(bromostyrene), poly (bromophenylmaleimide), brominated epoxy monomers or epoxy polymers, copolycarbonates derived from a halo-substituted diphenol and a diphenol, the halogen being preferably chlorine or bromine. Preferably, this copolycarbonate is the product of a halogenated bisphenol A, such as tetrabromobisphenol A and tetrachlorobisphenol A, and of a diphenol such as bisphenol A. Preferably, too, the fire-retarding halogenated organic compound is used in combination with an antimony compound such as, for example, antimony oxide.

It is possible to add to the compositions, according to the invention, any conventional additive such as extenders, reinforcing fillers, pigments, colorants, UV stabilizers, antioxidants, impact modifiers, etc.

EXAMPLES 4 TO 7 AND COMPARATIVE EXAMPLES A, B AND C

The mixtures of acrylonitrile-butadiene-styrene and of PTFE/SAN blends according to the invention, indicated in Table 5 below, were prepared. The quantities of PTFE/SAN blend added are such that the active polytetrafluoroethylene content is 0.1 parts by weight per 100 parts of ABS resin.

The mechanical and fire-resistance properties of the compositions are collated in Table 6.

The Vicat test was carried out according to the ISO 306 standard, the Izod impact-strength test according to the ISO 180 1A standard, the elongation and tensile yield stress tests according to the ISO 527 standard and the multiaxial impact-strength test according to the ISO 6603-2 standard.

COMPARATIVE EXAMPLES D TO F AND EXAMPLES 8 TO 11

In the examples below, the proportions of the constituents of the compositions are expressed in weight per cent with respect to the total weight of the composition.

As in the previous examples, the compositions indicated in Table 7 below were prepared.

TABLE 5

|  | Comparative example A | Comparative example B | Example 4 | Example 5 | Comparative example C | Example 6 | Example 7 |
|---|---|---|---|---|---|---|---|
| ABS | 100 | 100 | 100 | 100 | 100 | 100 | 100 |
| bis(tribromo-phenoxy)ethane [fire retardant] | 23 | 23 | 23 | 23 | 23 | 23 | 23 |
| $Sb_2O_3$ | 4 | 4 | 4 | 4 | 4 | 4 | 4 |
| Chlorinated polyethylene (CPE) powder | 3 | | | | | | |
| PTFE powder, 500 μm | | 0.1 | | | | | |
| Encapsulated 50/50 PTFE/SAN | | | 0.2 | | | | |
| Encapsulated 60/40 PTFE/SAN | | | | 0.1666 | | | |
| Coprecipitated 20/80 PTFE/SAN | | | | | 0.5 | | |
| Encapsulated 40/60 PTFE/SAN | | | | | | 0.25 | |
| Encapsulated 30/70 PTFE/SAN | | | | | | | 0.333 |

TABLE 6

|  | Comparative example A | Comparative example B | Example 4 | Example 5 | Comparative example C | Example 6 | Example 7 |
|---|---|---|---|---|---|---|---|
| Vicat B/120 (°C.) | 88.9 | 88.6 | 88.8 | 89.3 | 88.9 | 88.8 | 88.9 |
| Notched Izod impact strength (kJ/m$^2$) | 12.3 | 10.2 | 9.6 | 9.8 | 10.2 | 10.5 | 10.5 |
| Total-energy multiaxial impact strength (Nm) | 18 | 17 | 22 | 23 | 20 | 23 | 24 |
| Elongation to break, normal (%) | 51.87 | 56.75 | 55.55 | 53.25 | 55.85 | 57.93 | 64.98 |
| Tensile yield stress, normal (MPa) | 42.47 | 43.61 | 43.61 | 43.23 | 43.37 | 42.69 | 42.73 |
| Elongation to break, weld line (%) | 2.45 | 2.386 | 2.46 | 2.44 | 2.59 | 2.55 | 2.6 |
| Tensile yield stress, weld line (MPa) | 41.14 | 42.05 | 42.57 | 41.58 | 41.83 | 41.9 | 41.81 |
| Surface appearance | good | fibrous | good | good | good | good | good |
| UL 94, 1.6 mm: | | | | | | | |
| Dripping (flaming droplets) | yes | no | no | no | no | no | no |
| Classification | fails the test | V-0 | V-0 | V-0 | V-0 | V-0 | V-0 |

TABLE 7

| Component | Examples | | | | | | |
|---|---|---|---|---|---|---|---|
| | D | E | F | 8 | 9 | 10 | 11 |
| PC of 23,000 weight-average molecular weight | 98.92 | — | — | 98.992 | 98.956 | — | — |
| PC of 27,000 weight-average molecular weight | — | 98.92 | 98.85 | — | — | 98.956 | 98.93 |
| Mould-release agent | 0.40 | 0.40 | 0.40 | 0.40 | 0.40 | 0.40 | 0.40 |
| Fire-retardancy synergist | 0.45 | 0.45 | 0.50 | 0.45 | 0.45 | 0.45 | 0.50 |
| Antioxidant | 0.05 | 0.05 | 0.05 | 0.05 | 0.05 | 0.05 | 0.05 |
| 80/20 PC (M = 23,000)/PTFE dispersion | 0.18 | 0.18 | 0.20 | — | — | — | — |
| Encapsulated 50/50 PTFE/SAN | — | — | — | 0.108 | 0.144 | 0.144 | 0.12 |

The mechanical and fire-resistance properties of the compositions are given in Table 8.

TABLE 8

| | D | E | F | 8 | 9 | 10 | 11 |
|---|---|---|---|---|---|---|---|
| Notched Izod impact strength (kJ/m$^2$) | | | | | | | |
| at 0° C. | — | — | 23.0 | — | — | — | 29.1 |
| 10° C. | — | 26.2 | — | — | — | 38.8 | — |
| 23° C. | 16.4 | 58.5 | 60.3 | 15.3 | 15.1 | 48.5 | 69.0 |
| Tensile modulus (MPa) | 2440 | 2402 | 2345 | 2440 | 2394 | 2350 | 2266 |
| Yield stres (MPa) | 66.5 | 63.0 | 63.5 | 64.6 | 64.3 | 63.4 | 64.2 |
| Elongation to break (%) | 97.3 | 100.3 | 101.0 | 107.9 | 113.7 | 114.3 | 126.4 |
| Fire tests UL 94–1.6 mm Classification | V2 | V2 | V1 | V0 | V0 | V0 | V0 |
| UL 94–2.0 mm Classification | V0 | V0 | — | V0 | V0 | V0 | — |

Table 8 shows that, by using the novel blend according to the invention in polycarbonate resins, excellent fire resistance and the best compatibility, as shown by the exceptionally high values of elongation to break, are obtained.

COMPARATIVE EXAMPLES G TO I AND EXAMPLES 12 TO 14

In the examples below, the proportions of the constituents are given in parts by weight per 100 parts of resin.

The mixtures indicated in Table 9 were prepared by mixing pure PTFE and blends according to the invention with a self-extinguishing PC/ABS polymer blend. The self-extinguishing PC/ABS blend contains 80 parts by weight of polycarbonate and 20 parts by weight of acrylonitrile-butadiene-styrene resin, and conventional additives (fire retardants, antioxidants, lubricants, etc.).

TABLE 9

| Component | G | H | I | 12 | 13 | 14 |
|---|---|---|---|---|---|---|
| 80/20 PC/ABS | 100 | 100 | 100 | 100 | 100 | 100 |
| 80/20 PC/PTFE dispersion | 1 | — | — | — | — | — |
| Coprecipitated 20/80 PTFE/SAN | — | 1 | — | — | — | — |
| pure PTFE (500 μm) | — | — | 0.2 | — | — | — |
| encapsulated 50/50 PTFE/SAN | — | — | — | 0.4 | — | — |
| encapsulated 40/60 PTFE/SAN | — | — | — | — | 0.50 | — |
| encapsulated 30/70 PTFE/SAN | — | — | — | — | — | 0.67 |

The results of the mechanical and fire-resistance tests of the compositions of Table 9 are given in Table 10.

TABLE 10

| | Examples | | | | | |
|---|---|---|---|---|---|---|
| | G | H | I | 12 | 13 | 14 |
| Viscosity in the molten state (Pa.s) | 204 | 197 | 202 | 204 | 201 | 201 |
| Notched Izod impact strength (kJ/m$^2$) | 36.1 | 44.2 | 29.7 | 45.1 | 43.1 | 44.5 |
| Multiaxial impact strength | | | | | | |
| at room temperature (Nm) | 108 | 131 | 119 | 135 | 137 | 140 |
| at −20° C. (Nm) | 94 | 109 | 96 | 113 | 110 | 111 |
| Elongation to break (%) | 30 | 64 | 40 | 73 | 73 | 70 |
| UL 94: 1.6 mm | V0 | V0 | V0 | V0 | V0 | V0 |
| UL 94 5 V: 2.5 mm | fail | 5V | fail | 5V | 5V | fail |

Table 10 shows that the compositions of PC/ABS polymer blends according to the invention have better multiaxial and Izod impact strengths and exceptional elongation to break, while still containing good fire-resistance properties.

We claim:

1. A tetrafluoroethylene polymer-containing powder, comprising: free-flowing particles, said particles comprising a tetrafluoroethylene polymer at least partially encapsulated by a polymer or copolymer selected from the group consisting of polystyrene, poly-α-alkylstyrenes, styrene-acrylonitrile copolymers, α-alkylstyrene-acrylonitrile copolymers, acrylonitrile-butadiene-styrene copolymers, styrene-butadiene rubbers and their mixtures, wherein the encapsulating polymer or copolymer is obtained by emulsion polymerization of one or more monomers in the presence of a tetrafluoroethylene polymer latex.

2. A powder according to claim 1, wherein the encapsulation polymer or copolymer is selected from the group consisting of styrene-acrylonitrile copolymers, a-methylstyrene-acrylonitrile copolymers, acrylonitrile-butadiene-styrene copolymers and their mixtures.

3. The powder according to claim 1, wherein the tetrafluoroethylene polymer represents 0.01 to 80% by weight with respect to the total weight of the polymers in the powder.

4. The powder according to claim 1, wherein the tetrafluoroethylene polymer represents 0.05 to 70% by weight with respect to the total weight of the polymers in the powder.

5. An article obtained by extrusion moulding, extrusion blow moulding or injection moulding of a powder according to claim 1.

6. A composition, comprising: a polymer matrix and a tetrafluoroethylene polymer-containing powder according to claim 1 dispersed in the polymer matrix, wherein the polymer matrix is selected from the group consisting of polycarbonate resins, acrylonitrile-butadiene-styrene copolymers and mixtures thereof and wherein the tetrafluoroethylene polymer content in the composition is from 0.05 to 10 parts by weight tetrafluoroethylene polymer per 100 parts by weight of the polymer matrix.

7. Article obtained by extrusion moulding, extrusion blow moulding or injection moulding of a composition according to claim 6.

8. A process for making a tetrafluoroethylene polymer-containing powder, comprising: emulsion-polymerizing a monomer or mixture of monomers in the presence of a tetrafluoroethylene polymer latex to form particles, said particles comprising the tetrafluoroethylene polymer encapsulated in a polymer or copolymer selected from the group consisting of polystyrene, poly-α-alkylstyrenes, polybutadienes, styrene-acrylonitrile copolymers, α-alkylstyrene-acrylonitrile copolymers, acrylonitrile-butadiene-styrene copolymers, styrene-butadiene rubbers and their mixtures; and recovering the particles in the form of the free-flowing tetrafluoroethylene polymer-containing powder.

9. Process according to claim 8, wherein the emulsion polymerization is carried out by radical route.

10. A tetrafluoroethylene polymer-containing powder made by the process of claim 8.

11. The powder of claim 10, wherein the particles of the powder comprise a tetrafluoroethylene polymer encapsulated in a styrene-acrylonitrile copolymer, an acrylonitrile-butadiene-styrene copolymer, an α-methylstyrene-acrylonitrile copolymer or a mixture thereof.

12. A composition, comprising: a polymer matrix and a tetrafluoroethylene polymer-containing powder made by the process of claim 11 dispersed in the polymer matrix, wherein the polymer matrix is selected from the group consisting of polycarbonate resins, acrylonitrile-butadiene-styrene copolymers and mixtures thereof and wherein tetrafluoroethylene polymer content in the composition is from 0.05 to 10 parts by weight per 100 parts by weight of the polymer matrix.

* * * * *